United States Patent [19]

Johnson et al.

[11] Patent Number: 4,542,973
[45] Date of Patent: Sep. 24, 1985

[54] DYNAMICALLY CONTROLLED SCENE RADIATION LEAKAGE FOR EXPOSURE CONTROL

[75] Inventors: Bruce K. Johnson, Andover; George D. Whiteside, Lexington, both of Mass.

[73] Assignee: Polaroid Corporation, Cambridge, Mass.

[21] Appl. No.: 331,148

[22] Filed: Dec. 16, 1981

Related U.S. Application Data

[63] Continuation of Ser. No. 193,892, Oct. 6, 1980, abandoned.

[51] Int. Cl.⁴ ............................................. G03B 7/099
[52] U.S. Cl. .................................... 354/413; 354/482
[58] Field of Search ................................. 354/26–30, 354/42, 49, 59, 22, 23 R, 413, 416, 417, 481, 482, 483

[56] References Cited

U.S. PATENT DOCUMENTS

| | | |
|---|---|---|
| 2,086,791 | 7/1937 | Dresler . |
| 2,585,245 | 2/1952 | Harrison . |
| 2,926,562 | 3/1960 | Bretthauer et al. . |
| 3,035,503 | 5/1962 | Lee . |
| 3,045,124 | 7/1962 | McKinlay ............................ 250/226 |
| 3,173,347 | 3/1965 | Stimson et al. . |
| 3,208,363 | 9/1965 | Easterly et al. . |
| 3,270,638 | 9/1966 | Anwyl et al. . |
| 3,314,349 | 4/1967 | Koeber . |
| 3,397,023 | 8/1968 | Land ................................... 350/160 |
| 3,468,228 | 9/1969 | Rogers ................................. 354/38 |
| 3,500,730 | 3/1970 | Matsubara et al. . |
| 3,536,408 | 10/1970 | Norwood ............................. 356/219 |
| 3,583,299 | 6/1971 | Land . |
| 3,623,411 | 11/1971 | Gunther et al. . |
| 3,661,466 | 5/1972 | Stimson et al. ...................... 356/217 |
| 3,672,281 | 6/1972 | Land . |
| 3,709,615 | 1/1973 | Blakeslee et al. .................... 356/224 |
| 3,780,631 | 12/1973 | Schulman . |
| 3,792,649 | 2/1974 | Douglas .............................. 354/192 |
| 3,832,722 | 8/1974 | Douglas .............................. 354/29 |
| 3,856,418 | 12/1974 | Levin . |
| 3,864,701 | 2/1975 | Krause ................................. 354/49 |
| 3,896,458 | 7/1975 | Johnson et al. ....................... 354/30 |
| 3,903,413 | 9/1975 | Manning ............................. 250/226 |
| 3,942,183 | 3/1976 | Whiteside ............................. 354/29 |
| 3,942,184 | 3/1976 | Blinow et al. ........................ 354/42 |
| 3,963,333 | 6/1976 | Mueller et al. ...................... 352/72 |
| 4,040,070 | 8/1977 | Hochreiter et al. .................. 354/59 |
| 4,040,072 | 8/1977 | Johnson et al. ..................... 354/173 |
| 4,104,653 | 8/1978 | Johnson et al. ...................... 354/27 |
| 4,156,564 | 5/1979 | Tsunekawa et al. .................. 354/59 |
| 4,160,588 | 7/1979 | Beach ................................... 354/31 |
| 4,255,030 | 3/1981 | Johnson et al. ...................... 354/27 |
| 4,315,675 | 2/1982 | Johnson .............................. 354/26 |
| 4,358,186 | 11/1982 | Johnson et al. ...................... 354/27 |

FOREIGN PATENT DOCUMENTS 1001537 8/1965 United Kingdom .

OTHER PUBLICATIONS

U.S. patent application Ser. No. 156,198.
U.S. patent application Ser. No. 108,547.
U.S. patent application Ser. No. 127,120, (Now Abandoned).

*Primary Examiner*—William B. Perkey
*Attorney, Agent, or Firm*—Leslie J. Payne

[57] ABSTRACT

Method and exposure control apparatus are disclosed for generally simultaneously evaluating preselected different frequencies during a portion of the exposure cycle for controlling exposure. Included is an arrangement responsive to movement of the shutter mechanism for facilitating combined evaluation of a first set of preselected scene radiation frequencies transmitted along a given first path for evaluation of flash illumination and at the same time preselected lesser amounts of a second set of scene radiation frequencies, different from the first set, transmitted along a second given path for ambient evaluation. In one preferred embodiment, the evaluated first set of frequencies comprises essentially infrared frequencies and the evaluated second set of frequencies comprises essentially visible frequencies.

12 Claims, 6 Drawing Figures

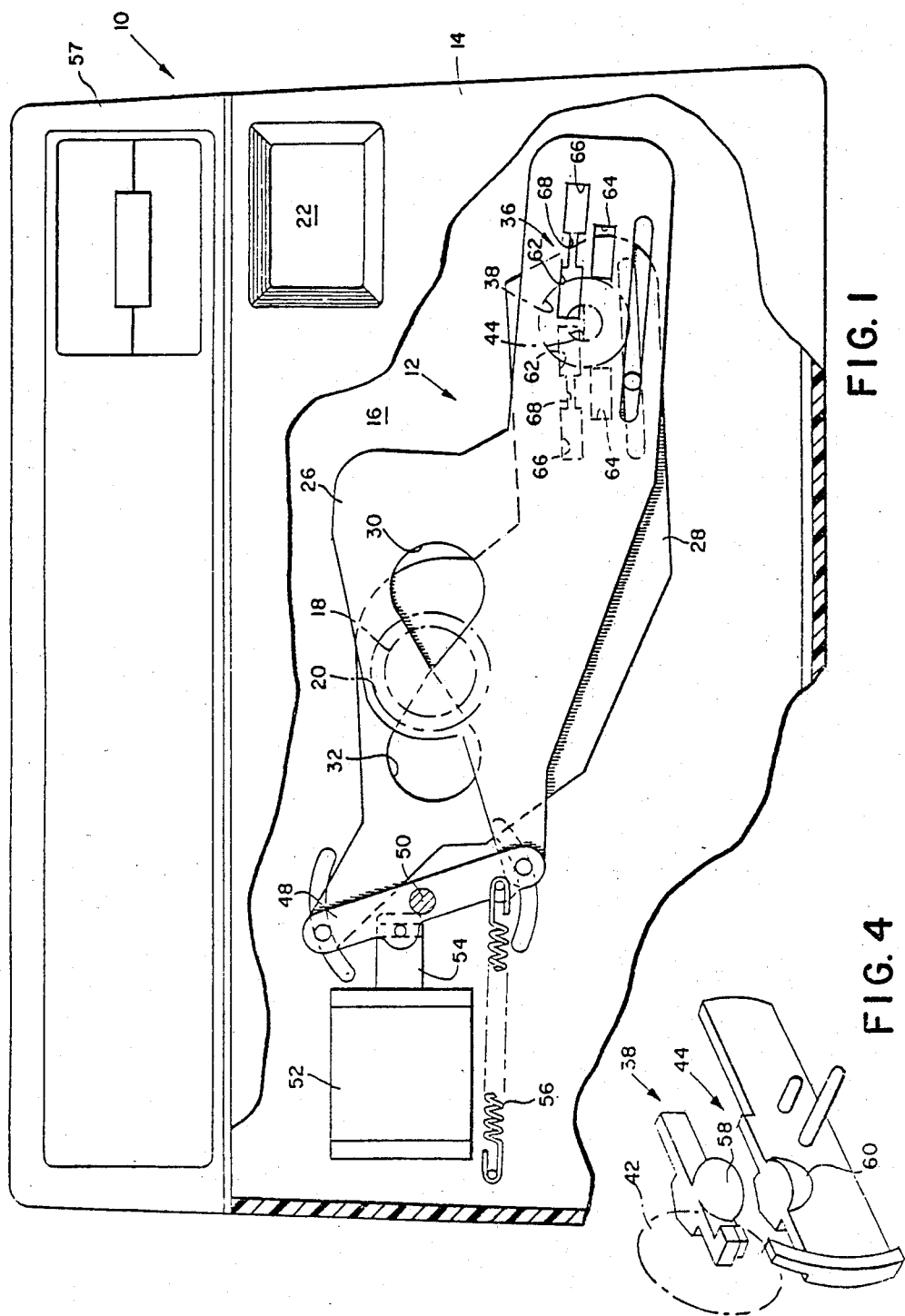

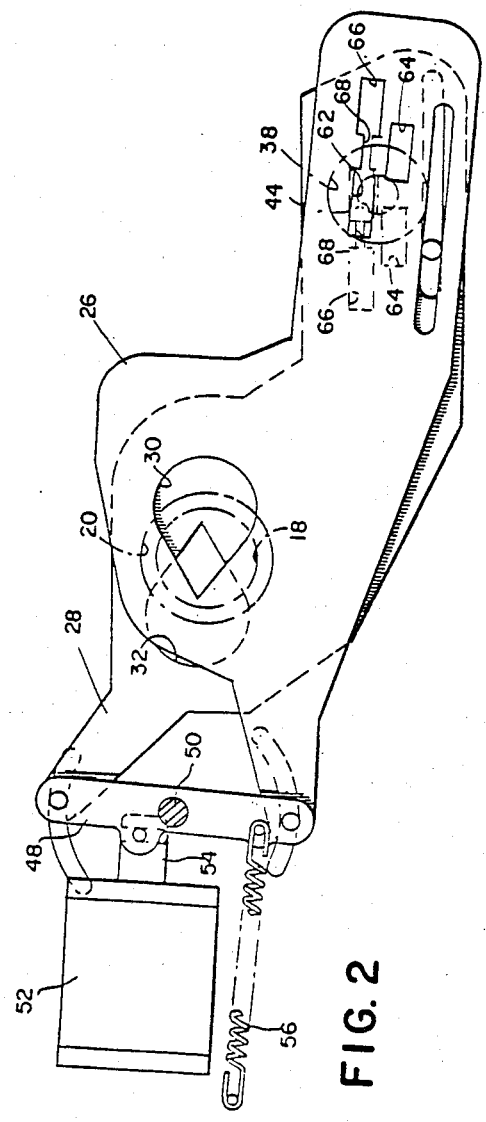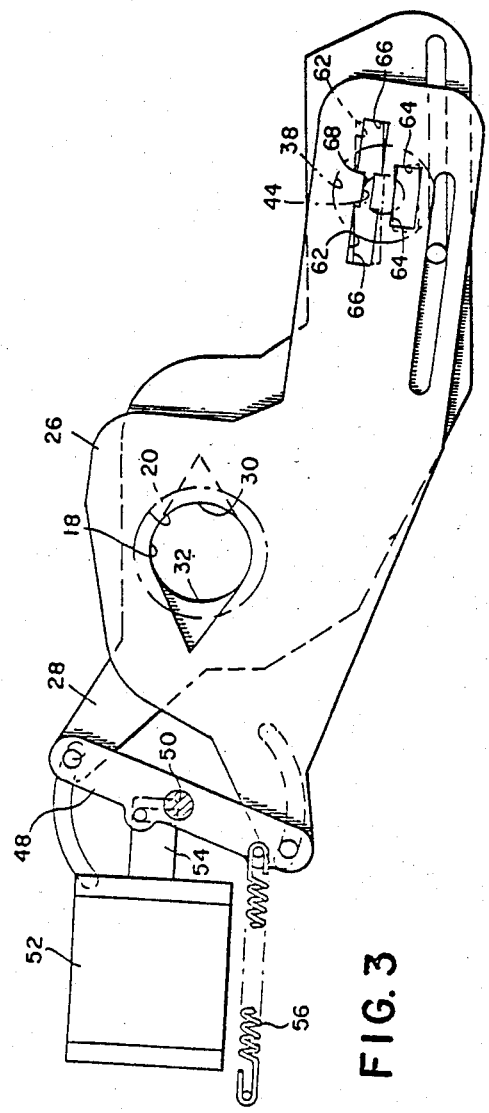

DYNAMICALLY CONTROLLED SCENE RADIATION LEAKAGE FOR EXPOSURE CONTROL

This is a continuation of application Ser. No. 193,892, filed Oct. 6, 1980 and now abandoned.

BACKGROUND OF THE INVENTION

This invention relates generally to the field of photography and, more particularly, an improved method and apparatus for controlling photoresponsiveness of exposure control systems during exposure.

Automatic light responsive exposure control systems are well-known in the photographic arts. One such automatic exposure control system employs scanning type shutter blades. Exemplary scanning shutter blades usable in such systems are disclosed generally in U.S. Pat. No. 3,942,183, issued Mar. 2, 1976, to George D. Whiteside; and U.S. Pat. No. 4,104,653, issued Aug. 1, 1978, to Bruce K. Johnson et al., all of which are presently assigned in common with the present application. As described in these patents, cooperating pairs of taking or primary, and secondary or photocell apertures are formed in the shutter blades. These pairs of apertures cooperate respectively for blocking and unblocking the passage of light through an exposure opening to a film plane, and through a photocell opening to a light sensing or photoresponsive cell used for controlling blade positioning. During the exposure cycle, the photocell apertures operate in conjunction with the photocell and a control circuit to define both the taking aperture values achieved and the exposure interval as a function of the amount of scene radiation received through the photocell apertures.

For optimizing photographic quality when using systems of the type noted, a spectral correction filter can can be employed in the photocell's optical path. Such filter correlates the spectral sensitivity curve of the photoresponsive element more closely with that of the eye. Without such a filter, it will be understood that the typical photocell would react to spectral frequencies, such as infrared (IR), so as to cause the control circuit to terminate an exposure interval earlier than desired. This is especially the case when the photocell is of the silicon type, because such a photocell tends to be red (IR) sensitive. Ordinarily then, use is made of a spectral correction filter having peak absorption in the near-infrared region and high transmission in the visual region.

While use of an infrared spectral filter serves satisfactorily, complications can arise with its usage particularly in flash exposures when reflectivities of different objects in photographic scenes exhibit widely disparate values. Partly as a result of this, it has been found advantageous to remove the infrared filter in flash exposure modes. Removal of this filter during flash firing does not, however, eliminate entirely the effect of the disparate visible reflectivity values.

It has been known to provide a fixed proportion of different spectral evaluation for improved exposure by employing a filter having select spectral filtering capabilities. While this approach can provide improvement in exposure, the manufacture of such filters is an expensive and time-consuming process requiring the maintenance of high standards for achieving consistent quality.

In copending and commonly assigned application Ser. No. 127,120, entitled "Method and Apparatus for Controlling Exposure by Selective Use of Blocking Visible Filter", filed Mar. 4, 1980, by John B. Millard which has been abandoned and replaced by continuation-in-part application having Ser. No. 204,045, filed Nov. 4, 1980, it has been proposed to use a spectral filter which, during a flash portion of the exposure interval in which the contribution of scene light is provided by the flash is important, blocks the visible frequencies, while exclusively passing the infrared frequencies. It has been found that with this arrangement, the disparate visible light reflectivity values giving rise to inaccurate evaluations of scene brightness during a flash firing are substantially reduced.

Copending and commonly assigned application Ser. No. 156,198, entitled "Method and Apparatus for Selectively Positioning Spectral Filter", filed June 3, 1980, by Bruce K. Johnson, now U.S. Pat. No. 4,315,675 discloses an exposure control system with artificial flash lighting employing a pair of photoresponsive regions having a blocking visible spectral filter for the strobe mode and a blocking infrared spectral filter in the ambient mode. In this system, the shutter mechanism is provided with a photocell aperture arrangement which, during shutter scanning, alternatively directs scene radiation to one or the other photoresponsive regions depending on the ambient light conditions.

This approach represents a significant advance in providing improved exposure under many different lighting conditions. However, even this approach has potential for less than satisfactory results in certain, relatively uncommon, scene lighting situations. For example, difficulties can arise under low ambient conditions in scenes having a relatively high amount of infrared radiation, such as produced by green plants, since the blocking visible filter is overlying the photocell during a significant amount of the exposure such that the cell exclusively receives infrared frequencies. As a result, a likelihood for underexposure exists.

This is due, in part, to the fact that with such scanning shutter systems the blocking visible filter is controlling passage of scene radiation to the photocell for a significant portion of the time the photocell circuit is integrating the scene radiation. Hence, when only infrared is being passed to the photocell, as when the blocking visible/passing infrared filter is controlling, the photocell response for terminating exposure will be accentuated due to the infrared of the green plants.

It should be mentioned that in the last-noted application, as the photocell aperture arrangement was shifted from visible to infrared evaluation, it integrated for a short time both visible frequencies and infrared frequencies. This occurred, for example, during transition of the blocking infrared filter to the blocking visible filter over the photocell. Such integration of both frequencies was considered undesirable. Also, the actual duration of this simultaneous integration in such system is negligible in terms of time and thus in terms affecting exposure. Thus, the degree of this dual integration of both visible and infrared frequencies was intended to be and was in fact minimized as much as possible.

SUMMARY OF THE INVENTION

An object of this invention is to provide a method and apparatus for improving exposure control. Towards this end, preselected amounts of different scene radiation frequencies are generally simultaneously evaluated for controlling exposure.

As in prior art exposure control systems for use in photographic apparatus having means for directing scene radiation along an optical path to a focal plane, the system includes means for producing a flash of illumination, means for controlling transmission of scene radiation from the scene to the focal plane during movement from one position to another position so as to define an exposure interval, and means, responsive to the intensity of scene radiation for controlling movement of the transmission means between said positions so as to establish an exposure interval and means for evaluating select proportions of select spectral frequencies during a portion of the exposure to control the response to both ambient and flash illumination.

In the illustrated embodiment, a scene radiation evaluating means includes a first means for controlling passage of infrared frequencies along a first path to the photocell for flash evaluation and second means for simultaneously passing a preselected amount of visible spectral frequencies along a second path to the cell during a portion of the exposure where the flash contribution is relatively great, as for example, under low ambient. The preselected amount of the visible spectral frequencies being evaluated can vary depending upon the type of control desired, but in any event is greater than a negligible amount of scene radiation being evaluated.

In one preferred embodiment, the first and second paths include first and second spectral filters respectively with the first and second aperture portions being responsive to movement of the transmission means for generally alternating evaluation of scene radiation along the given first and second paths. A first set of spectral frequencies is blocked along the first path and a second set of spectral frequencies is blocked along the second path. The second means simultaneously passes scene radiation along one of the first or second paths while the transmission controls passage along the other path for permitting combined preselected evaluation.

In another preferred embodiment, the first and second paths include visible blocking and infrared blocking filters respectively, with first and second aperture portions being responsive to movement of the transmission means for generally alternating evaluation of scene radiation along the given first and second paths. Infrared scene light is blocked along one path and visible light along the other. The second path is employed at lower light levels when flash lighting is relatively contributive to the exposure. To accommodate the relatively short flash interval with the longer period during which the second path, with infrared transmission, is operative, a relatively smaller aperture is opened over the first path to provide some evaluation of ambient visible light during this portion of the exposure interval while retaining infrared evaluation for the flash.

In this particular embodiment, the evaluating means simultaneously evaluates the intensity of infrared frequencies, which comprise a significant amount of the total scene radiation, and a relatively smaller percentage of the visible spectral frequencies.

Among the objects of the invention are, therefore, a method and apparatus for providing improved control over photographic exposures; the provision of an improved method and apparatus for improving flash photography; and, the provision of an improved method and exposure control system for selectively proportioning predetermined amounts of different scene radiation frequencies during an exposure cycle in order to improve exposure control.

Other objects and further scope of applicability of the present invention will become apparent from the detailed description to follow when taken in conjunction with the accompanying drawings in which like parts are designated by like reference numerals.

BRIEF DESCRIPTION OF THE DRAWINGS

FIG. 1 is a diagrammatic frontal view in elevation depicting a photographic apparatus incorporating the improved exposure control system of this invention including the improved photocell aperture arrangement;

FIG. 2 is a diagrammatic frontal view in elevation showing scanning shutter blades and the improved photocell aperture arrangement in one operative position;

FIG. 3 is a view similar to FIG. 2, but showing the photocell aperture arrangement in yet another operative position;

FIG. 4 is an exploded perspective view showing an enlarged split photocell arrangement;

DETAILED DESCRIPTION

Figure 5:
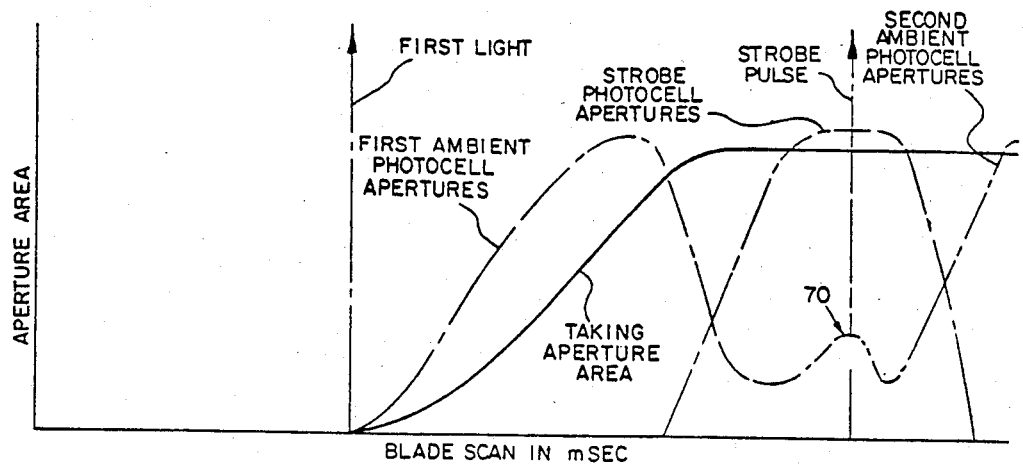
FIG. 5 is a graphical representation showing the variation of taking and photocell aperture areas as a function of shutter blade scanning time.

FIG. 1 illustrates a photographic camera apparatus 10 of the self-developing kind having an improved exposure control system 12. Stationarily affixed in and to a camera housing 14 is a base block casting 16. Centrally formed in the casting 16 is a light exposure opening 18 constructed for defining the maximum available exposure aperture of the system 12, as well as for allowing scene radiation to reach an image recordable photographic film unit (not shown) of a film pack (not shown). Examples of film packs containing multiple film units of the self-developing type usable in a camera of the kind indicated above are described in U.S. Pat. Nos. 3,543,662; 3,705,542; 3,748,984 and 3,779,770. These film packs are of the kind manufactured and sold by the Polaroid Corporation, Cambridge, Mass. Each of the film units of the film pack is successively positioned at the focal plane (not shown) of the camera 10.

Connected to and supported by a front wall of the camera housing 14 in overlying relationship to the light exposure opening 18 is a variable focal objective lens assembly or arrangement 20. The lens arrangement 20 permits image carrying rays passing therethrough to be reflected from a mirror (not shown) housed in the camera housing 14 to the uppermost one of the film units in the film pack located at a focal plane. Also, this invention envisions use of a fixed focus lens assembly instead of a variable focal lens assembly.

Connected to the front face of the camera housing 14 is a viewing window 22 which, in conjunction with the camera viewing system (not shown), permits viewing and framing of a subject to be photographed.

Continued reference is made to FIG. 1 along with FIGS. 2–4 for better depicting the improved exposure control system 12. Included in the system 12 is a blade mechanism comprising a pair of scanning shutter type blades 26 and 28. Since the blade mechanism does not, per se, form an aspect of the present invention, only a description of its construction and operation necessary for a complete understanding of the present invention will be given. Reference is, however, made to commonly assigned U.S. Pat. No. 4,040,072 for a more complete description of such a blade mechanism. The shutter blades 26, 28 are supported for scanning type reciprocatory movement on and by the base block casting 16 so as to be positioned intermediate the lens arrangement 20 and the light exposure opening 18.

Formed in the scanning shutter blades 26, 28 is a pair of taking or scene light admitting primary apertures 30, 32; respectively. During blade scanning movement, the taking apertures 30, 32 coincide in overlapping relationship with respect to both the light exposure opening 18 and the lens arrangement 20 to define progressively increasing taking aperture areas as a function of blade positioning. In this embodiment, the taking apertures 30, 32 define a time-variable taking exposure aperture area which is indicated by the taking aperture curve in FIG. 5. Basically, the foregoing provides means for controlling transmission of scene radiation along an optical path to the focal plane so as to define an exposure interval during a scene radiation evaluating period.

Also formed in the shutter blades 26, 28 is a set of corresponding pairs of secondary or photocell sweep apertures indicated generally by reference numeral 36. Basically, the corresponding and overlapping set of photocell apertures 36 define a plurality of small, effective photocell aperture areas for controlling the passage of scene radiation along separate respective paths to a light detecting station shown generally at 38. The photocell aperture set 36 provides evaluating aperture means for controlling passage of scene radiation to the light detecting station 38 responsive to the displacement of the shutter blades 26, 28.

The light detecting station 38 includes a photocell assembly of the silicon photodiode type having a photocell detector 42 (FIG. 4) and a lens assembly 44. The photodetector 42 cooperates with a light integrating circuit (not shown), in a well-known manner, for energizing a solenoid 52 for terminating the exposure interval of the shutter blades 26, 28, as a function of the time integration of scene radiation intensity incident on the photodetector 42. The amount and character of scene radiation incident on the photodetector 42 are controlled by the photocell sweep apertures 36 and the photocell lens assembly 44. The foregoing provides means for evaluating scene radiation.

Distal ends of the shutter blades 26, 28 are pivotally connected to distal ends of a walking beam 48. In turn, the walking beam 48 is pivotally connected to the base block casting 16 by a pivot pin 50. Distal ends of the walking beam 48 have pin members extending through respective circular openings formed in the respective shutter blades 26, 28. These pin members slidably engage respective arcuate slots formed in the base block casting 16 for prohibiting shutter blade disengagement.

Displacement of the shutter blades 26, 28 is provided, in part, by the solenoid 52. Included in the solenoid 52 is an internally arranged and movable plunger unit 54. This plunger unit 54 is affixed to the walking beam 48 by means of a pivot pin or stud. Longitudinal displacement of the plunger unit 54 is effective for rotating the walking beam 48 about the pivot pin 50. Solenoid energization retracts the plunger unit 54 into the solenoid housing, thereby driving the shutter blades 26, 28 to a scene light blocking condition (FIG. 1); whereby the taking apertures 30, 32 do not overlap or coincide. Biasing spring 56 normally serves to force the plunger unit 54 outwardly from the solenoid housing so as to tend to rotate the walking beam 48 in a counterclockwise direction. Such rotation follows solenoid deenergization. Thus, the biasing spring 56 urges continuously the taking apertures 30, 32 and the set of photocell apertures 36 to positions defining their effective aperture areas, as will be described more fully. Towards this end, one end of the biasing spring 56 is affixed to the casting 16 while its opposite end is attached to the walking beam 48. Of course, reenergization of the solenoid 52 will overcome the biasing effect of the spring 56 to terminate an exposure cycle or interval. Reenergization commences in response to the light detecting station integrating a preselected quantity of scene radiation. For a more complete description of the foregoing structure and function, reference is made to the last noted patent. The foregoing provides means for controlling displacement of the shutter blades 26, 28 for defining the exposure interval.

Although this embodiment is described for use with non-reflex type cameras, the intended scope of this invention is, of course, by no means so limited. Thus, cameras of the well-known reflex type, such as described in U.S. Pat. No. 3,672,281, entitled "Reflex Camera", by E. H. Land, commonly assigned herewith may be equally suitable for embodying the exposure control system of this invention.

Power for the camera apparatus 10 comes from a battery (not shown) housed in the film pack. For conserving battery power, the solenoid 52 should not be continuously energized for maintaining the shutter blades 26, 28 in their scene light blocking position. Towards this end, a latch mechanism (not shown) is provided. Details regarding the latching mechanism as well as its mode of operation in conjunction with the shutter blade operation do not, per se, form an aspect of this invention. Therefore, reference is made to the last noted patent for a more complete description thereof.

The strobe unit 57 and its operation do not, per se, form an aspect of the present invention. Hence, a detailed description thereof is dispensed with. However, for purposes of understanding this invention, only a brief description of its construction and function are given. For a more detailed description, reference is made to copending application Ser. No. 156,198 entitled "Method and Apparatus For Selectively Positioning Spectral Filter", filed June 3, 1980, by Bruce K. Johnson, and commonly assigned herewith and now U.S. Pat. No. 4,315,675. Briefly, the strobe unit 58 is a quench type fill-in flash unit and has its pulse of illumination of limited maximum duration during the exposure.

As indicated, the integrating circuit of the light detecting station 38 integrates the amount of scene radiation intensity incident upon the photodetector 42 as a function of time. Of course, this occurs as long as the set of photocell apertures 36 and lens assembly 44 are effective in a manner to be described for controlling scene radiation to the photodetector 42.

Referring back to the photocell lens assembly 44 (FIG. 4), it directs the scene light onto the photodetector 42, as well as spectrally filters various frequencies of scene. Included in the lens assembly 44 are upper and lower optical lens elements 58 and 60, respectively. Since the lens assembly 44 of this embodiment does not, per se, form an aspect of this invention, only a brief description thereof will be given for better understanding this invention. However, reference is made to the last noted application for a more detailed description of its construction and operation. Briefly, the upper lens element 58 transmits and directs spectral frequencies in the visible range (e.g., 400–700 nm) to the photodetector 42 while blocking frequencies in the near infrared range or region (e.g., 700–1200 nm). Conversely, the lower lens element 60 transmits exclusively infrared frequencies, but blocks the visible spectrum frequencies.

For exposure control purposes, the upper optical lens element 58, which generally exclusively blocks the infrared frequencies, directs spectrally filtered scene radiation controlled by the photocell apertures 36 to the photodetector 42. The lens element 58 is used predominantly in situations involving moderate-to-high ambient light, wherein the primary aperture values are generally less than maximum. With the scene light being spectrally filtered to block IR, the potential of overexposing blue sky is eliminated. As noted, a flash can be fired during this exposure. Since flash contribution under these levels of ambient light is not controlling in terms of exposure, the lack of precise flash accuracy is tolerated in favor of ambient control.

The lower optical lens element 60, which passes essentially infrared frequencies, directs scene radiation to the photodetector 42. It is used predominantly in situations involving firings of the strobe 57, wherein the level of ambient light is low and accordingly the flash contribution is significant as compared to the ambient. Under these conditions, the primary effective aperture value established by the taking apertures 30, 32 is at a maximum and infrared spectral frequencies will be evaluated by the photodetector 42. Hence, the relatively more uniform reflectivity values of the infrared frequencies are utilized.

It will be understood that continued blade scanning causes the photocell apertures 36 to cooperate so that the upper optical lens element 58 again becomes effective. Generally, this will occur in situations involving predominantly low ambient light at large subject distances where the effect of flash is negligible. Such conditions can occur during early morning or late evening with a distant photographic subject; for example, under low light conditions when taking pictures of the Grand Canyon, wherein the objects of the scene are too remote to reflect a significant amount of flash intensity. Under such conditions, it is preferred to return to scene evaluation excluding IR radiation. Hence, the upper lens element 58 becomes effective for such purposes.

Turning back again to the photocell aperture set 36, reference is made to FIGS. 1–3 and 5 for better illustrating its construction and functional cooperation with the upper and lower optical lens element 58, 60; respectively, for achieving the selective use of such lens elements, as indicated above, and in a manner in accordance with this invention. Each of the shutter blades 26, 28 includes ambient photocell aperture 62, strobe photocell aperture 64, ambient photocell aperture 66, and ambient control photocell aperture 68. The ambient control apertures 68, when overlapping, as shown in FIG. 3, provide means for leaking preselected amounts of scene radiation to the photodetector for regulating exposure in a desired manner.

For better understanding the sequencing of the set of photocell apertures 36, reference is initially made to FIG. 1 where the shutter blades 26, 28 are shown in the scene light blocking condition wherein the taking apertures 30, 32 are not in overlapping coincidence. When the exposure interval is commenced, as is described more fully in the last noted patent, the shutter blades 26, 28 are driven, under the influence of the biasing spring 56, so that the taking apertures are in their scene light admitting conditions (FIGS. 2 and 3).

During the initial portion of shutter blade scan from the scene light blocking condition to a light unblocking condition, the ambient photocell apertures 62 initially progressively and overlappingly cooperate. During this overlapping coincidence, they form distinct ambient photocell aperture areas which change as a function of blade scanning. The coinciding ambient apertures 62 are effective for controlling scene radiation passing through the upper lens element 58, along a first path, to the photodetector 42. Hence, visible spectral frequencies will be evaluated by the noted control circuit associated with the photodetector 42. Also, these photocell apertures coincide for a first select portion of the exposure interval. In this regard, reference is made to the first ambient photocell curve (FIG. 5) for representing the ambient photocell aperture area defined by the ambient photocell apertures 62. Since the blade scan is terminated early under moderate-to-high scene light levels by the light detecting station 38, spectral filtering of frequencies, such as infrared, is provided for the predominantly ambient exposure.

Under lower ambient light levels, where the flash provides a significant contribution, the infrared frequencies are evaluated by the system. In this regard, continued blade scan results in the ambient photocell apertures gradually passing out of coincidence and the strobe photocell apertures 64, 64 progressively coinciding with each other for a second select portion of the exposure interval. As shown in FIG. 5, the apertures 64 form effective strobe photocell aperture areas which change as a function of blade positioning during scanning. The coinciding strobe photocell apertures 64 are effective for permitting scene radiation passing through the lower lens element 60 to travel along a second path to the photodetector 42. While the strobe photocell apertures 64 are operative in the manner described, the ambient photocell apertures 62 close. Thus, passage of scene radiation along the first path is terminated. When the strobe apertures 64 are coinciding, the photodetector 42 will respond to infrared radiation. Reference is made to the curve in FIG. 5 for illustrating the aperture area defined by the strobe photocell apertures 64 during scanning. It is apparent that the cooperating pairs of apertures 62, 64 effect, in general, an alternation of the paths the scene radiation takes to the photodetector 42. Moreover, the time duration of the second select portion defined by the coinciding apertures 64 exceeds the duration of the illumination pulse to adequately accommodate the latter. As noted, because the apertures 64 are open for a period exceeding the flash pulse the flash mode will be adversely affected by high amounts of infrared radiation.

The ambient photocell apertures 66 are constructed to overlap with each other during continued shutter blade displacement. This overlap is effective to change the scene radiation path to the photodetector 42 back to the noted first path, whereby the photocell sweep apertures 66 overlap to direct the scene radiation back again to the upper optical lens element 58. Although the overlapping of the photocell apertures 66 is not illustrated, such arrangement is described more fully in the last noted copending application.

It is pointed out that with the foregoing type of photocell aperture arrangement on scanning blades, as described in the last noted application, the coinciding photocell sweep apertures 62 and 64 and 62 and 64; can generally simultaneously pass scene radiation to the upper and lower optical lens elements 58 and 60, respectively. However, such dual passage of scene radiation is for a negligible portion of the scan, whereby the amount of leakage of the integrated visible frequencies versus the integrated infrared frequencies, when the apertures 64 are overlapping, is also negligible. For example, the leaked visible frequencies can comprise about less than 5 to 7 percent of the total scene light integrated when the apertures 64 are controlling passage of scene radiation to the photodetector.

In contrast, the present embodiment can fix the proportion of visible frequencies integrated versus the infrared frequencies integrated during that portion of the evaluation period the strobe photocell apertures 64 are overlapping. Towards this end in this embodiment, visible spectral frequencies are being passed by coinciding ambient control apertures 68 (FIG. 3). Hence, visible spectral frequencies are passed along the first path and are simultaneously sensed by the photodetector 42 while the strobe apertures 62 are coinciding and passing scene radiation along the second path to the photodetector. Thus, the integrating circuit of the light detecting station 38 integrates not only infrared frequencies, but visible as well during this portion of the evaluation period. Such controlled proportioning of the total amount scene radiation integrated during said portion provides desired exposure control in a number of exposure situations. For example, it has been determined that improved exposure control is provided in the flash mode, when the strobe photocell apertures 64 coincide with a scene containing relatively high amounts of infrared; such as green plants. In such situations, the photodetector 42, which without the advantage of this invention would be exclusively responsive to the infrared frequencies, is not exclusively responsive to the infrared frequencies because visible frequencies are also being simultaneously evaluated. Because of such simultaneous evaluation it has been found that the integration of scene radiation is delayed so that the solenoid 52 is re-energized at a later time, as compared to the time which would be taken with exclusive infrared evaluation. Consequently, the exposure is terminated later and the possibility of underexposure, under such scene conditions, is significantly minimized.

In the illustrated embodiment, each ambient photocell aperture 68 extends continuously to and between the ambient photocell apertures 62 and 66. Each ambient photocell aperture 68 has an area considerably less than the area of each of the corresponding ambient photocell apertures 62, 66, as well as the strobe photocell aperture 64.

Reference is made to FIG. 5 for demonstrating the varying aperture areas produced by the coincidence of the ambient apertures 68, and this is designated generally by the curve 70.

Based on the foregoing, exposure disadvantages inherent in scenes having high infrared content and intended to be photographed during a strobe mode, with shutter blades and photocell assembly passing substantially exclusive infrared frequencies, are substantially overcome by passing controlled amounts of visible spectral frequencies, through the upper lens 58 along the first path preferably substantially simultaneously and continuously with the strobe photocell apertures 64 passing infrared radiation along the second path.

Although the illustrated embodiment shows the ambient apertures 68 being relatively uniform and continuously arranged between the ambient photocell apertures 62 and 66, it will be appreciated that the ambient apertures 68 can have other configurations and dimensions. Also, they do not have to extend continuously between the apertures 62 and 66.

It will be appreciated that the proportion of scene radiation integrated by scene radiation passing through lens element 58 as compared to that integrated by the scene radiation passing through lens element 60 can vary depending upon the exposure control desired.

It should be appreciated that leaking aperture arrangements other than the one illustrated can be provided. For instance, an aperture similar to ambient aperture 68 can be provided in each shutter blade so as to coincide when the ambient photocell apertures 62 are coinciding. It is understood, of course, that such an aperture arrangement would be effective in controlling passage of scene radiation to the lower optical lens element 60 while the apertures 62 are directing scene radiation to the upper lens element 58. If need be, aperture arrangements can be provided so as to modify exposure each time one of the coinciding pairs of photocell apertures 66-66 is effective for controlling passage of scene radiation to the photodetector 42 through the lens assembly 44.

Clearly, the proportion of spectral frequencies integrated simultaneously can be regulated for suitably altering the photoresponse of the exposure control system 12. It has been determined that the ambient photocell aperture 68 can contribute a significant portion of the total scene radiation integrated when the strobe photocell apertures are effective. For purposes of illustration, acceptable exposures in photographs were obtained when the visible light contributed as much as 50 percent of the total scene radiation integrated when the strobe photocell apertures 64 were effective in causing the photodetector to be responsive to infrared frequencies. A preferred proportion of total visible infrared scene radiation simultaneously integrated can be in the order of about 25 percent visible to 75 percent infrared.

After the above description, it is believed that the construction, operation and function of the foregoing exposure control system is self-evident.

Figure 6:
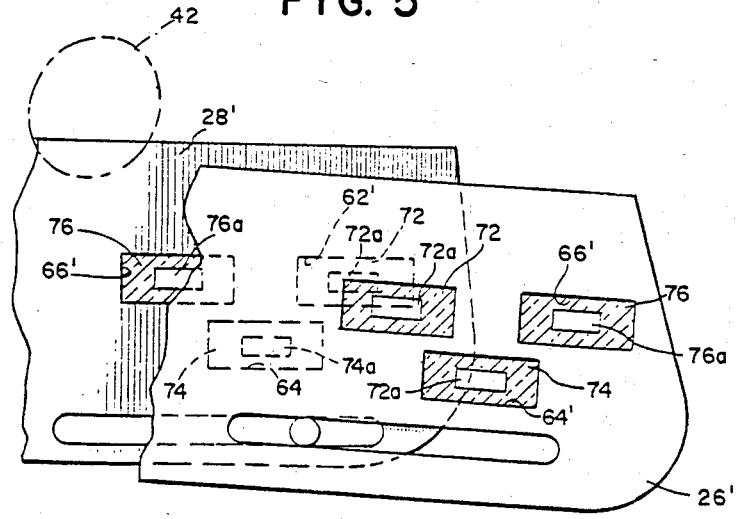
FIG. 6 is a schematic representation of another embodiment of this invention.

Reference is made to FIG. 6 for showing another preferred embodiment of this invention. As depicted, the photocell apertures 62', 64' and 66' on each of the blades 26', 28' are provided with spectral filters 72, 74 and 76; respectively. Use of spectral filters on the shutter blade itself for controlling photoresponse is described more fully in copending application Ser. No. 110,811, entitled "Apparatus for Varying the Spectral Filter Over the Photocell as a Function of Blade Position", by Milton S. Dietz, filed Jan. 10, 1980, and in common assignment herewith. Thus, a detailed description of how the spectral filter on a blade controls passage of scene light during an exposure cycle is described in the above application, since it does not, per se, form an aspect of this invention. The apertures 62', 64', 66' function as described in the previous embodiment for directing scene radiation along respective paths to the photodetector.

The spectral filters 72 and 76 can be similar in terms of spectral characteristics to those of the upper optical element 58. Similarly, the spectral filter 74 can be like the lower optical element 60 in terms of spectral characteristics. Simultaneous evaluation of different spectral frequencies is achieved in this embodiment by control apertures 72a, 74a and 76a formed respectively in the spectral filters 72, 74 and 76. Thus, whenever one of the pairs of apertures 72a, 74a, and 76a coincide and overlap over the photodetector 42, they create an additional or second path of scene radiation which passes a second set of spectral characteristics different from the spectral characteristics reaching the photodetector from the surrounding overlapping spectral filters. Of course, the areas defined by each aperture, 72a, 74a, 76a could be comprised of by spectral filters themselves having spectral characteristics other than the type surrounding such areas. In this regard, the area surrounding such an arrangement need not have spectral filters.

Obviously, in this embodiment, the lens assembly (not shown) would only function to direct scene light to the photodetector 42 since there is no need for the lens assembly performing any spectral filtering.

In another preferred embodiment, the lower lens element 60 could be manufactured so that its spectral characteristics are such that it would pass preselected proportions of visible spectral to infrared frequencies for those scenes where flash would be fired and the photocell apertures 64 would be effective for passing scene radiation thereto. For example, it has been determined that acceptable exposures are obtainable when the proportion of visible light integrated is about 50 percent of the total integrated scene radiation including the infrared radiation when the strobe apertures are controlling passage of scene radiation. It will be appreciated that the higher the proportion of infrared integrated, as opposed to visible light integrated, the better the exposure for scenes in which the flash is fired. In this regard, if the lens element 60 were constructed to permit 75 percent of the total integrated scene radiation to be contributed by infrared frequencies and 25 percent to visible frequencies when the strobe apertures 60 are controlled, then the advantages of using substantially all infrared frequencies in scenes controlled by strobe firing are not severely compromised and the additional advantage of accommodating scenes having a high amount of infrared during strobe firing can be obtained. Of course, the foregoing proportions can be fixed depending upon the exposure control desired. It will be understood that the proportion of visible frequencies integrated or evaluated will be significant, in other words, more than negligible. Thus, the term significant as used throughout the specification and claims means more than a negligible amount. In one embodiment, as indicated, evaluation of up to about 7 percent of the total scene radiation integrated when the blocking visible filter was controlling is considered negligible.

Since certain changes may be made in the above described apparatus without departing from the scope of the invention herein involved, it is intended that all matter contained in the description or shown in the accompanying drawings shall be interpreted as illustrative and not in a limiting sense.

What is claimed is:

1. In an exposure control system for a photographic apparatus, means for illuminating the scene with a pulse of illumination of limited maximum duration during the exposure, means for controlling transmission of scene radiation to the focal plane of the apparatus to provide an exposure interval and for evaluating scene lighting during the exposure interval, the transmission controlling and evaluating means including means for transmitting infrared while blocking visible spectral frequencies from evaluation during a select portion of the exposure interval at which the illumination pulse will be relatively contributive to the exposure, the select exposure portion being of an extended duration greater than the maximum duration of the illumination pulse to adequately accommodate the latter, the improvement wherein:

the means for transmitting infrared and blocking visible spectral frequencies comprises means for transmitting a reduced but significant amount of the visible spectral frequencies during said select exposure portion to provide evaluation of ambient visible light during this portion while retaining infrared evaluation of scene illumination by the pulse said significant amount being more than a negligible amount of the total scene radiation evaluated during said select exposure portion.

2. The system of claim 1 wherein said selected amount of visible light blocking is from about 50% to 90% of the total amount of radiation evaluated from the scene during said exposure portion.

3. The system of claim 1 wherein said selected amount of visible light blocking is approximately 75% of the total amount of radiation evaluated from the scene during said exposure portion.

4. The system of claim 1 or 2 or 3 wherein said transmission control and evaluating means includes a first means which is responsive to infrared frequencies and not responsive to visible frequencies, a second means which is responsive to visible frequencies and not responsive to infrared frequencies, and means defining discrete apertures for simultaneously directing an amount of scene light to said first means for infrared evaluation and a comparatively lesser amount of scene light to said second means for visible light evaluation during said exposure portion.

5. In an exposure control system for a photographic apparatus, means for illuminating the scene with a pulse of illumination of limited duration during the exposure, means for controlling transmission of scene radiation to the focal plane of the apparatus to provide an exposure and for evaluating scene lighting during the exposure, the transmission controlling and evaluating means including means for transmitting infrared while blocking visible spectral frequencies from evaluation over a select portion of the exposure interval at which the illumination pulse will be relatively contributive to the exposure, the exposure portion being of an extended duration greater than the duration of the pulse of illumination to adequately accommodate the latter, the improvement wherein:

said transmission control and evaluating means includes a first means which is responsive to infrared frequencies only and not responsive to visible frequencies, a second means which is responsive to visible frequencies and not responsive to infrared frequencies, and means defining discrete apertures for simultaneously directing an amount of scene light to said first means for infrared evaluation and a comparatively lesser amount of scene light to said second means for visible light evaluation during said select exposure portion to thereby provide some evaluation of ambient visible light throughout this portion while retaining infrared evaluation of scene illumination by the pulse.

6. In an exposure control system for use in a photographic apparatus having means for directing scene radiation along an optical path to a focal plane, the system including means for controlling transmission of scene radiation to the focal plane during movement from one position to another; means for evaluating scene radiation; means for controlling movement of the transmission control means between said positions for defining an exposure interval in response to the evaluating means; the improvement wherein:

said evaluating means includes means responsive to the movement of said transmission controlling means for facilitating evaluation of a given amount of a first set of preselected scene radiation frequencies along a given first path during at least a portion of the evaluation; and means responsive to the movement of said transmission means for facilitating evaluation of a reduced amount of a second set of preselected scene radiation frequencies along a given second path substantially throughout said portion of the evaluation so that said reduced evaluated amount of said second set is more than a negligible amount of the total scene radiation evaluated during said portion.

7. In an exposure control system for use in a photographic apparatus having means for directing scene radiation along an optical path to a focal plane, the system including means for controlling transmission of scene radiation from the scene during movement from one position to another to define an exposure period; means for evaluating scene radiation; means for controlling movement of the transmission control means between said positions for defining the exposure interval in response to the evaluating means; the improvement wherein:

said evaluating means includes first and second means responsive to first and second sets of preselected scene radiation frequencies along first and second paths, respectively; and means responsive to the movement of said transmission means for generally simultaneously transmitting controlled amounts of scene radiation along said first and second paths during a portion of the exposure period, said first means including means for transmitting a comparatively lesser amount of said first set of frequencies of the scene radiation along said first path substantially throughout said portion of the evaluating period wherein said comparatively lesser amount is more than a negligible amount of the total scene radiation evaluated during said portion.

8. The system of claim 7 wherein said first and second means includes a pair of photosensitive regions and first and second spectral filters which control transmission of said first and second sets of preselected frequencies to said regions, respectively, and said means responsive to the movement of said transmission means includes first and second apertures which respectively optically coincide with said first and second filters during said portion.

9. A method of exposing image recordable material comprising the steps of:

initiating an exposure interval by directing scene radiation to image recordable material located at a given focal plane;

evaluating a given amount of a first set of spectral frequencies comprising essentially infrared spectral frequencies during a portion of the exposure interval;

evaluating a comparatively lesser amount of a second set of spectral frequencies comprising essentially visible spectral frequencies during said portion so that the evaluated second set of frequencies comprises a reduced but significant portion of said second set of frequencies radiated from said scene during the portion of the evaluation period wherein said reduced but significant portion of said second set of frequencies is more than a negligible amount of the total scene radiation evaluated during said portion; and firing, during said portion of the evaluation period, a pulse of artificial illumination of a limited duration less than the duration of said portion of the evaluation period.

10. The method of claim 9 wherein the selected infrared frequencies evaluated are from about 50 to 90 percent of the total amount of radiation evaluated during the portion.

11. A method of exposing image recordable material comprising the steps of:

initiating an exposure interval by directing scene radiation to image recordable material located at a given focal plane;

evaluating a first range of spectral frequencies along a first path during a portion of the exposure interval; and evaluating a comparatively lesser amount of a second range of spectral frequencies different from the first range along a second path substantially throughout said portion with the evaluated second range of frequencies comprising a preselected portion of the total scene radiation wherein said preselected portion is more than a negligible amount of the total scene radiation evaluated during said portion.

12. In an exposure control system for a photographic apparatus, means for illuminating the scene with a pulse of illumination of limited maximum duration during the exposure, means for controlling transmission of scene radiation to the focal plane of the apparatus to provide an exposure interval and for evaluating scene lighting during the exposure interval, the transmission controlling and evaluating means including means for transmitting infrared while blocking visible spectral frequencies from evaluation during a select portion of the exposure interval at which the illumination pulse will be relatively contributive to the exposure, the select exposure portion being of an extended duration greater than the maximum duration of the illumination pulse to adequately accommodate the latter, the improvement wherein:

the means for transmitting infrared and blocking visible spectral frequencies comprises, means for defining an aperture for facilitating transmission of a reduced but significant amount of the visible spectral frequencies during said select exposure portion to provide evaluation of ambient visible light during this portion while retaining infrared evaluation of scene illumination by the pulse wherein said reduced but significant amount of visible evaluated is greater than about 7 percent of the total scene radiation evaluated during said portion.

* * * * *